Aug. 6, 1968 N. O. ROSAEN 3,395,802

FLUID FILTER CONDITION INDICATORS

Filed Dec. 16, 1966 4 Sheets-Sheet 1

INVENTOR.
NILS O. ROSAEN
BY
ATTORNEYS

INVENTOR
NILS O. ROSAEN

Aug. 6, 1968 N. O. ROSAEN 3,395,802
FLUID FILTER CONDITION INDICATORS
Filed Dec. 16, 1966 4 Sheets-Sheet 4
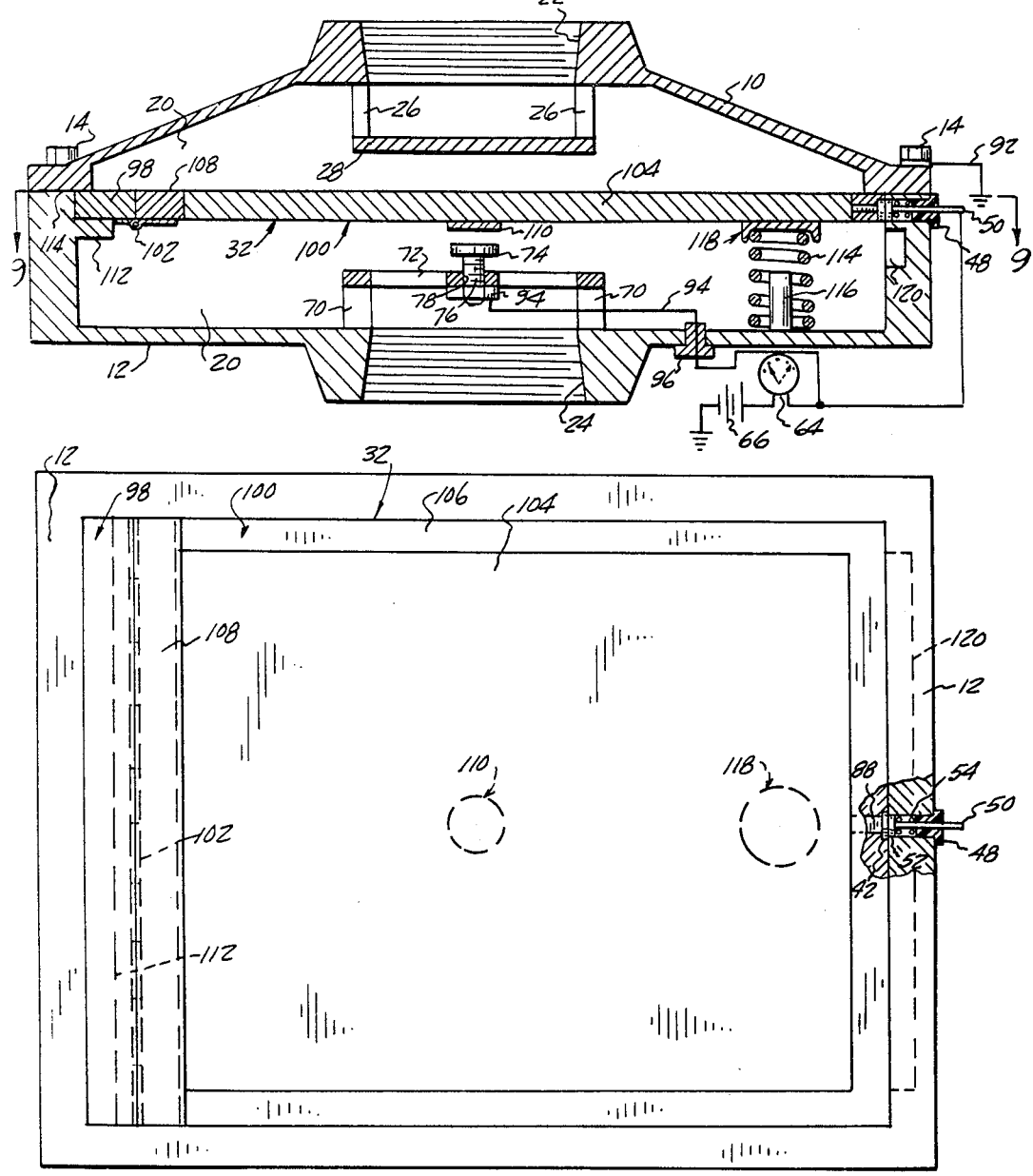
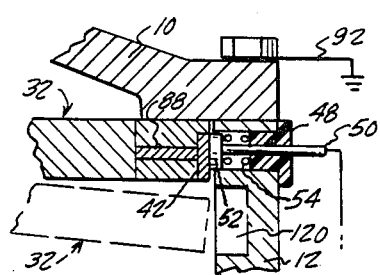
INVENTOR
NILS O. ROSAEN
BY Hauke, Krase, & Gifford
ATTORNEYS

3,395,802
FLUID FILTER CONDITION INDICATORS
Nils O. Rosaen, Bloomfield Hills, Mich., assignor to The Rosaen Filter Company, Hazel Park, Mich., a corporation of Michigan
Continuation-in-part of application Ser. No. 465,346, June 21, 1965. This application Dec. 16, 1966, Ser. No. 602,210
16 Claims. (Cl. 210—90)

ABSTRACT OF THE DISCLOSURE

Indicators for the clogged condition of filter elements in fluid filtering systems, each comprising an electrical circuit with the indicator in series with the filter element. The resistance of the filter element varies accordingly to its clogged condition and results in a signal displayed by the indicator.

Cross-reference to related application

The present invention is continuation-in-part of application Ser. No. 465,346, filed June 21, 1965, now abandoned.

Background of the invention

The present invention relates to fluid filter devices and more particularly to filter devices having novel means for sensing and indicating the clogged condition of the filter elements.

Filter elements for fluid filtering systems must be periodically cleaned or replaced. Heretofore many attempts have been made to provide filter devices having easily cleanable filter elements in combination with a reliable and accurate means of indicating the condition of the filter elements. The present invention provides such filter devices.

Summary of the invention

According to the principles of the present invention, the clogged condition of the filter element is sensed and measured by placing the filter element in an electrical circuit including a visual indicator, or the like, of the electrical conductivity or resistivity of the element which is proportional to the extent of its clogged condition.

As will become more apparent as the description proceeds, one aspect of the present invention is to provide a filter device having a filter element constructed of a plurality of individual beads. The beads are preferably constructed of a material having a high electrical resistance and are carried within a resilient and electrically insulated perforated structure intermediate the inlet and the outlet of the filter device. The filter element is connected in series with a source of electricity and an ammeter so that changes in electrical conductivity through the filter element will be indicated on the ammeter. As the filter element becomes clogged, the resulting increase in pressure differential across the filter element causes a compacting of the beads to thereby decrease the electrical resistance across the filter element. This decrease is sensed and indicated by the ammeter so that, by providing proper indicia on the ammeter, the latter indicates the clogged condition of the filter element.

Another aspect of the invention contemplates utilizing the decrease of electrical resistivity of an ordinary filter element becoming progressively loaded superficially by dirt being less resistive, at the electrical point of view, than the material forming the filter element. Such change in resistivity is detected by means of an electrical meter, such as an ammeter, placed in an electrical circuit including the filter element.

It is therefore an object of the present invention to improve fluid filter devices by providing such filter devices with a filter element having means varying the electrical resistance across the element in response to changes in the clogged condition of the element and means indicating changes in the electrical resistance across the element to thereby indicate its clogged condition.

It is another object of the present invention to improve filter devices by providing such devices with a readily cleanable filter element combined with a reliable and accurate means for indicating the clogged condition of the filter element.

It is yet another object of the present invention to improve the reliability of filter element condition indicating means by providing a new filter element constructed of a plurality of individual beads or balls of material having a high electrical resistance which are carried within a resilient perforated container adapted to be disposed intermediate the inlet and outlet of a filter device so that increases in the pressure differential across the element will more tightly pack the beads together to decrease the electrical resistance produced thereby by providing means associated therewith adapted for sensing and indicating the changes in the electrical resistance across the filter element.

Yet a further object of the invention is to provide means electrically detecting the clogged condition of a filter element when such condition reaches a predetermined dangerous state.

Still further objects and advantages of the present invention will readily occur to one skilled in the art upon reference to the following description and the accompanying drawings in which like reference characters refer to like or equivalent parts throughout the several views, and wherein:

Brief description of the drawings

FIG. 7 is a longitudinal cross-sectional view of a further example of embodiment of the present invention;

FIG. 8 is an enlarged fragmentary view of a portion of the structure shown in FIG. 7; and FIG. 9 is a transverse cross-sectional view of the embodiment of FIGS. 7 and 8 taken substantially along line 9—9 of FIG. 7.

Description of the preferred embodiments

Figure 1:
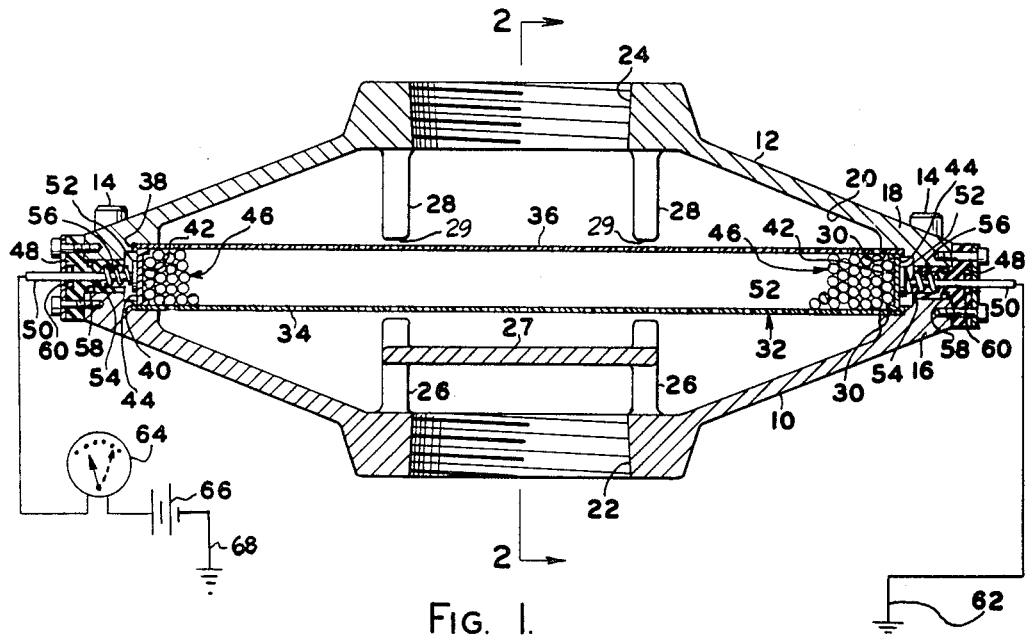
FIG. 1 is a longitudinal cross-sectional view of an example of an embodiment of the present invention.

Now referring to the drawings for a more detailed description of the present invention, an example of a first preferred filter device is therein illustrated in FIGS. 1–4 as comprising a first housing member 10 and a second housing member 12 preferably secured one to the other by a plurality of bolts 14 extending through mating peripheral flanges 16 and 18 of the housing members 10 and 12 respectively.

A filter chamber 20 is defined by the housing member 10 and 12 which may be square, rectangular or circular in transverse section. An inlet port 22 is provided in the housing member 10 and an oppositely positioned outlet port 24 is provided in the housing member 12 with the inlet port 22 and the outlet port 24 open to the filter chamber 20. The housing member 10 has a plurality of parallel posts 26 extending into the filter chamber 20 from opposite sides of the inlet port 22. The posts 26 provide the means for carrying a baffle member 27 in a position spaced inwardly of and extending across the inlet port 22. The housing member 12 has similar posts 28 extending into the filter chamber 20 from opposite sides of the outlet port 24 and having inner edges 29.

The inner peripheral edges of the housing member 10 and 12 are provided with complementary recesses 30 which define the means for carrying a flat filter element 32 in the filter chamber 20 intermediate the inlet port 22 and the outlet port 24. The filter element 32 preferably comprises perforated support wall members 34 and 36 having inwardly extending peripheral flanges 38 and 40 respectively. The flanges 38 and 40 are secured one to the other along a pair of opposite edges, as can best be seen in FIG. 2, and are of a reduced dimension along the other pair of opposite edges as can best be seen in FIGS. 1 and 3, to permit diametrically opposed plate contact members 42 to be secured intermediate the support wall members 34 and 36, each plate contact member 42 having a face portion 44 exposed intermediate the flanges 38 and 40. A plurality of disconnected individual beads 46, as can best be seen in FIGS. 3 and 4, are carried within the space defined by the support wall members 34 and 36 and flanges 38 and 40 and are in contact with the inner surfaces of the plate contact members 42.

Figure 3:
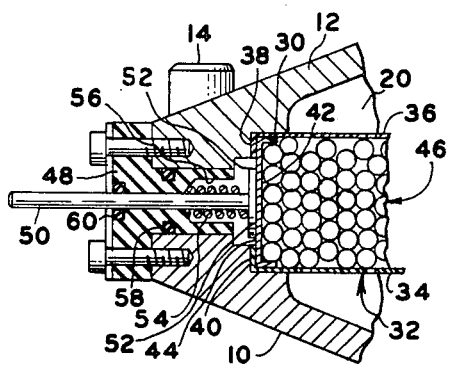
FIG. 3 is an enlarged fragmentary view of a portion of the structure illustrated in FIG. 1.
Figure 2:
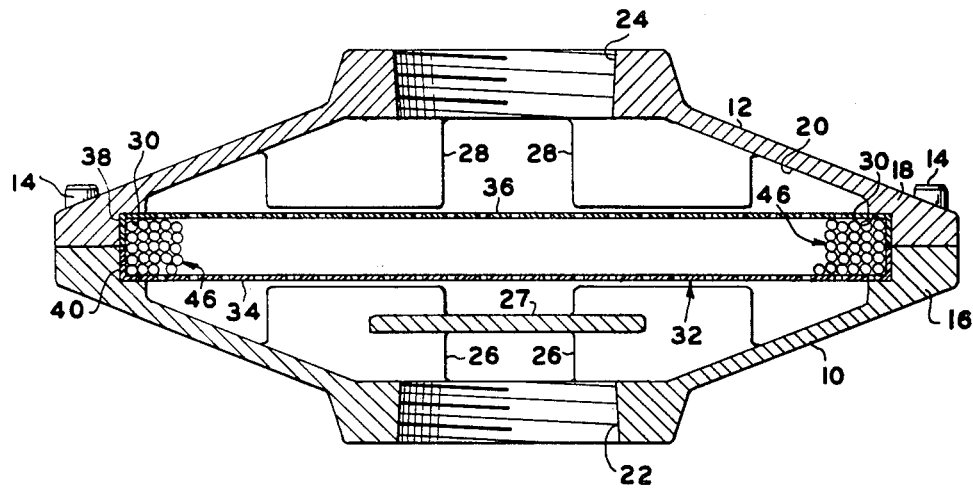
FIG. 2 is a cross-sectional view taken substantially on line 2—2 of FIG. 1.
Figure 4:
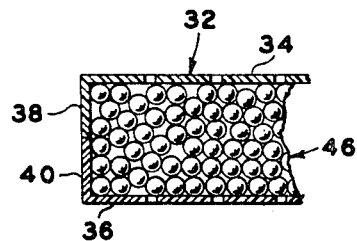
FIG. 4 is an enlarged fragmentary view of a portion of the structure shown in FIG. 2.

Insulator bushings 48 are mounted intermediate the housing members 10 and 12 on opposite sides of the filter element 32 and provide the means for axially slidably carrying contact plungers 50, as can best be seen in FIG. 3, having inner discs 52 for engaging the plate contact members 42. Springs 54, carried in recesses 56 provided in the bushings 48, urge the discs 52 into engagement with the plate contact members 42. O-ring seals 58 and 60 carried by the bushings 48 prevent fluid leakage along the exterior surface of the bushings 48 and between the bushings 48 and the shank of the contact plungers 50.

One of the contact plungers 50 is electrically grounded as indicated diagrammatically at 62 in FIG. 1, and the other plunger 50 is electrically connected through a conventional ammeter indicated diagrammatically in FIG. 1 at 64 to a terminal of a source of electrical power 66 having its other terminal grounded as shown at 68.

The support wall members 34 and 36 are preferably constructed of a resilient electrical insulating material so that the filter element 32 is completely electrically insulated from the housing members 10 and 12. The contact plungers 50, the contact plate members 42 and the individual beads 46 are preferably constructed of an electrically conducting material, although the material of the beads has preferably a high resistivity such as beads of ceramics, glass, molded carbon resistor material, high resistivity stainless steel and the like, such that the power source 66, the ammeter 64, the contact plungers 50, the plate contact member 42 and the beads 46 form a series electrical circuit.

The support wall members 34 and 36 being made of a resilient material and posts 28 having their inner edges 29 closely adjacent the support wall member 36, there results a compaction of the beads 46 within the support wall members 34 and 36 upon a pressure differential across the filter element 32 that causes the support wall member 36 to engage the inner edges 29 of posts 28, the degree of compaction of the beads depending upon the degree of clogging of the filter element 32. As the filter element 32 becomes clogged, the pressure differential across the element increases. This increased pressure differential causes support wall members 34 and 36 to flex toward the outlet port 24, and when the support wall member 36 engages the edges 29 of the posts 28 the area within the support wall members 34 and 36 decreases so that the beads 46 are more tightly packed within this area.

The beads 46 are preferably constructed of a material which, although capable of conducting electricity has, as previously explained, a high resistance to electrical current, and as the beads become more tightly packed, the current flowing through the filter element 32, and which is of the order of a few milliamperes, can be read on the ammeter 64. Since the decrease in resistance across the filter element 32 is proportional to the degree of clogging thereof, by providing proper indicia on the ammeter 64 the degree of clogging of the filter element 32 can thus be visually indicated exteriorly of the filter device.

Figure 5:
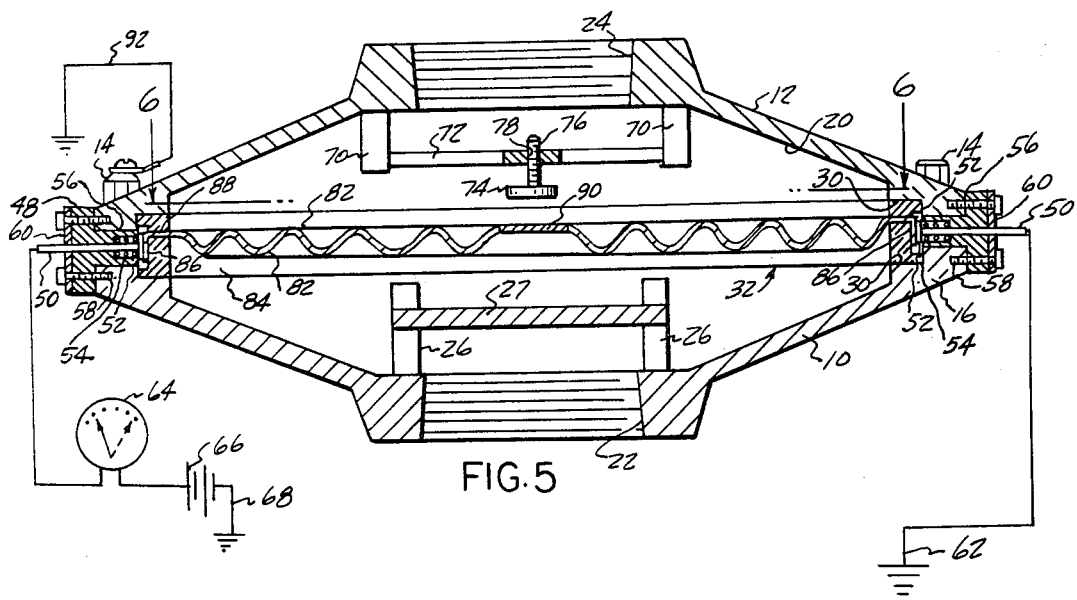
FIG. 5 is a longitudinal cross-sectional view of another example of embodiment of the present invention.
Figure 6:
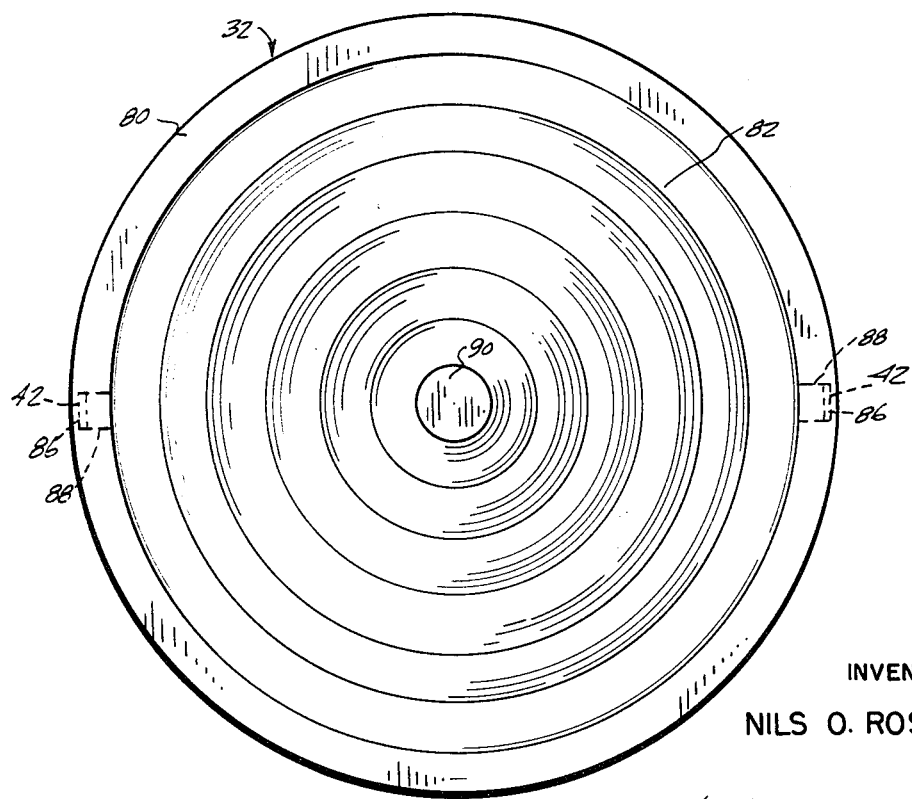
FIG. 6 is a plan view of the filter element in the embodiment of FIG. 5 as seen substantially from line 6—6 of FIG. 5.

Referring now to the example of embodiment of the present invention illustrated in FIGS. 5–6, a filtering device is shown being in all respects similar to the preceding embodiment, with the exception that the filter element 32 is of a different construction and is shown as having a circular area such that the filter chamber 20 has a correspondingly circular transverse section, and that posts 28 of the preceding embodiment have been omitted. Surrounding the outlet port 24 and extending into the filter chamber 20 are disposed a plurality of posts 70 supporting an apertured plate member 72 adapted to support, preferably substantially at its center, a contact member 74 having a threaded portion 76 engaging a threaded bore 78 disposed in the plate member 74. The filter element 32 comprises an annular flange portion 80 made of a material substantially having dielectric characteristics with respect to electrical current conductance.

The annular flange member 80 is adapted to support a corrugated filtering wall member 82, made of, for example, woven plastic or glass fibers, cellulose, or the like, cemented, bonded or otherwise fastened to the inner surface 84 of annular member 80. On two diametrically opposed positions, annular member 80 is provided with recesses 86 in which are disposed small plate contact members 42 electrically connected, as shown at 88, to the filtering material 82. The filtering material 82 is further provided with a metallic portion, substantially at its center, as shown at 90.

As in the precedently described embodiment, contact plungers 50 disposed in insulated bushings 48 are biased by springs 54 in such a manner that discs or contacts 52 engage plate contact members 42. One of the plungers 50 is electrically connected to ground, as shown at 62, while the other is connected through ammeter 64 to a terminal of an electrical power supply 66 having its other terminal grounded as shown at 68. In addition, the housing of the filter device is grounded by any convenient means such as shown at 92. During normal operation, the filtering material 82 of filter element 32 is disposed in a series electrical circuit which also includes the ammeter 64, and the electrical power supply 66, the return being effected through ground. Ammeter 64 gives an indication which corresponds to the current flowing through the filtering material 82. As the filter element 32 becomes gradually clogged and coated on its inlet face with dirt which is better conductor of electricity than the filtering material 82 of filter element 32, ammeter 64 gives a deviation which corresponds to the current being conducted in the series circuit, consequently, which corresponds to the amount of clogging of the filter element 32. As the filtering material 82 becomes further and further clogged with dirt, the pressure differential across the filter element 32 increases and the element tends to flex towards the outlet port 24 until metallic portion 90 of the filter element engages the face of electrical contact 74. Electrical contact 74 being grounded, as being electrically connected to the housing of the filter device, and this cuts the resistance of the filtering material 82 approximately in half, with the result that the indicator means consisting of ammeter 64 suddenly jumps to a predetermined visual display giving an indication that the filter element 32 is clogged to a point where it requires replacement.

It is evident that contact 74 may be adjusted to any appropriate position, either towards or away from metallic portion 90 of the filter element, such that the amount of permissible clogging of the filter element may be predetermined.

It is also evident that the arrangement of FIGS. 5 and 6 may be modified to give, instead of a progressive indication of the amount of clogging of the filter element 32, an "all-or-nothing" indication by omitting the contact plunger 50 which is grounded at 62, and by making the filtering material 82 of a material substantially conductive to electricity such as a metallic fiber fabric or the like. In this manner, as long as the pressure differential across the filter element 32 is low enough contact 74 is out of engagement with metallic portion 92, but as soon as the filter element 32 is clogged to the point that it flexes filtering material 82 towards the outlet port 24, contact 74 engages metallic portion 90 such that the series circuit including indicator 64 is closed and a visual display consisting of a light or an alarm may be sounded to give a warning of the excessive clogging of the filter element.

Referring now to FIGS. 7–9, which represent a further modification of a filter device according to the present invention, a filter chamber is defined by two half housings 10 and 12, substantially square or rectangular in transverse section, connected together at a junction plane by means such as bolts 14. Half housing 10 is provided with the usual inlet port 22, a baffle 28 supported by post members 26 being disposed within the filter chamber 20 on its inlet side, so as to direct the flow of the fluid to be filtered substantially evenly over the surface of the filter element 32. An apertured support plate 72 is mounted proximate the outlet port 24 by means of posts 70 and is arranged to be electrically insulated from half-housing 12. This can be done by making the posts 70, or support plate 72, or both, of a dielectric material. Support plate 72 is provided with an electrical contact 74 having a threaded body portion 76 engaging a threaded bore 78 substantially at the center of the support plate 72. A terminal 92 is electrically connected, as shown by electric wire 94 passing through insulating bushing 96 pressed, threaded, or otherwise fastened in a wall portion of half housing 12, to a terminal of ammeter 64 having its other terminal connected to a terminal of an electric power supply 66, the other terminal of which is connected to ground return.

The filter element 32 comprises two distinct portions which are respectively mounting portion 98 and filtering portion 100, hinged relatively to each other by any convenient means such as hinge 102 which may be, as shown, substantially like the well-known so-called "piano" hinges. Mounting portion 98 of the filter element 32 is made of a material being substantially a good conductor of electricity, and the hinged portion 100 of the filter element comprises a filtering material portion 104 made of a material preferably having a high electrical resistance which is supported by a frame 106 made of a substantially dielectric material except at its end, as shown at 108, which is contiguous to and in electrical contact with the support portion 98 through hinge 102. Filtering material 104 has an electrical contact 110 disposed so as to correspond to electrical contact 74 when the filter element is placed in normal position within the housing, as shown in the drawings, by having its mounting portion 94 clamped between a ledge or flange 112 integral with half-housing 12 on one side thereof and flange portion 114 of half housing 12. As best seen in FIG. 8 the side of filter element 32 parallel to the hinged portion 102 is provided with a contact plate 42 electrically connected, as shown at 88, with filtering material 104. The contact end 52 of a plunger 50 slidably disposed in an insulating bushing 48 pressed or threaded through the wall of half housing 12 is constantly urged by spring 54 into electrical contact with contact plate 42. Plunger 50 is electrically connected to the same terminal of indicator 64 as the terminal to which is connected contact 74. A coil spring 114, best seen in FIG. 7, and disposed around pin 116 dependent from or integral with half housing 12, is arranged to normally bias the hinged portion 100 of filter element 32 towards inlet port 22, the frame 106 of the filter element being thus in engagement with flange 114 of half housing 110. Spring 114 is electrically insulated from the material 104 of the filter element 32 by means of dielectric washer 118. The housing of the filter device is normally grounded, as shown at 92, and a by-pass recess 120 is disposed in a wall of half housing 12, where shown, for the purpose to be hereinafter explained. During normal operation, filter element 32 occupies the position indicated in the drawing in full line, and is electrically in a series circuit including the electrical power supply 66 and the indicator 64, which may be an ammeter, in addition to the filtering material 104, the current return being effected through the grounded connections. The resistance of the filtering material 104 being substantially high, no or little deviation is shown on indicator 64.

As filter element 32 becomes further and further clogged with dirt which has a lesser electrical resistivity than the resistivity of the filtering material 104, the current passing through the circuit increases in proportion to the clogging of the filter element, and the clogged condition of the filter element 32 is visually displayed by indicator 64. When the clogged condition of the fiter element 32 reaches a predetermined value causing a pressure differential between inlet 22 and outlet 24 of the device, such pressure differential becomes high enough to cause hinged portion 100 of filter element 32 to be displaced to the position shown in phantom lines in FIGS. 7 and 8, as soon as that pressure differential is sufficient to overcome the force exerted by spring 114. Although in this position contact 52 no longer engages contact plate 42, contact 110 carried by filtering material 104 of the filter element 32 engages contact 74, thus cutting the resistance placed in the series circuit to a much lower value which is indicated by indicator 64 which, as precedently mentioned, may also be arranged to operate any appropriate alarm. In view of the presence of by-pass groove 120, in spite of the clogged condition of the filtering element 104, fluid is still capable of flowing substantially freely across the filter device from inlet port 22 to outlet port 24 through the by-pass such that there is no danger resulting from a decrease in the flow of fluid or interruption thereof.

It is evident that in the embodiment of FIGS. 7–9 also, the contact plunger 50 and the associated contact plate 52 may be omitted, and that a substantially good current conducting material may be used as filtering material 104, such that the device may be adapted to give an "all or nothing" indication of the clogged condition of the filter element.

It will be evident to those skilled in the art that although the electrical indicator providing an indication of the clogged condition of the filter element has been described as an ammeter connected in an electrical series circuit so as to operate for all practical purposes as an ohmmeter adapted to give a visual display of the resistance of the filter element, the electrical indicator may consist of a voltmeter connected across the filter element so as to give a reading corresponding to the voltage drop thereacross. Alternately, a bridge arrangement may be used, whereby the resistance of the filter element is continuously compared to a known resistance. In addition, the electrical visual indicator may be supplemented, or replaced, by means giving an alarm or shutting off the equipment incorporating the filter device as a component thereof.

It is apparent from the preceding description that new means have been disclosed for sensing and indicating the clogged condition of filter elements for fluid systems. The particular means utilized have been found to be highly accurate and reliable and yet are much less expensive to manufacture than many other heretofore known filter devices having filter element clogging indicating means.

It is also apparent that although there have been described but a few embodiments of the invention, many changes and modifications can be made therein without departing from the spirit of the invention as expressed in the appended claims.

I claim:

1. A filter device for filtering a fluid comprising:
   (a) means defining a filter chamber and an inlet and an outlet open to said filter chamber;
   (b) a filter element in said filter chamber between said inlet and outlet, said filter element being made of a filtering material having an electrical resistance varying according to the clogged condition of said filtering material;
   (c) electric circuit means comprising said filter element; and
   (d) electrical indicator means included in said electric circuit for giving an indication of the clogged condition of said filter element in response to the change in resistance of said filtering material.

2. The device as defined in claim 1 wherein said filtering material comprises a plurality of individual beads of a relatively high electrical resistance and means compacting said beads upon an increase in the pressure differential across said filter element for decreasing the total resistance of said plurality of individual beads.

3. The device as defined in claim 2 and wherein said last mentioned means comprises a pair of resilient support wall members carrying said beads and means limiting deflection of one of said support members.

4. The device as defined in claim 1 further comprising means adapted to suddenly vary the resistance of said filtering material for a predetermined clogged condition of said filter element.

5. The device as defined in claim 4 wherein said mentioned means comprises:
   (a) a first stationary electrical contact;
   (b) a second movable electrical contact on said filtering material;
   (c) associated electrical connections between said contacts so as to electrically substantially shorten the effective electrical length of said filtering material when said contacts are engaged;
   (d) said second contact being mounted on a portion of said filter element adapted to move toward said first contact as a result of the fluid pressure differential across said filter element so as to engage said first contact upon a predetermined pressure differential corresponding to a predetermined state of clogging of said filter element.

6. The device as defined in claim 5 wherein said filter element is flexibly movable toward said first contact.

7. The device as defined in claim 5 wherein said filter element is hingedly movable toward said first contact and is urged away from said first contact by spring means.

8. The device as defined in claim 7 further comprising fluid by-pass means for permitting fluid to by-pass said filter element when said filter element is hingedly moved to the position engaging said first and second contacts.

9. A filter device for filtering a fluid comprising:
   (a) means defining a filter chamber and an inlet and an outlet open to said filter chamber;
   (b) a filter element in said filter chamber between said inlet and outlet, said filter element being made of a filtering material having an electrical resistance varying according to the clogged condition of said filtering material;
   (c) an electrical circuit comprising in series said filtering material, a source of electrical power and an ammeter whereby the total resistance of said filtering material in said filter element is continuously monitored; and
   (d) said ammeter providing a visual display of the state of clogging of said filter element as a function of a decrease in resistance of said filtering material resulting in an increase in electrical current circulating in said circuit.

10. The device as defined in claim 9 wherein said filtering material comprises a plurality of individual beads of a relatively high electrical resistance and means compacting said beads upon an increase in the pressure differential across said filter element for decreasing the total resistance of said plurality of individual beads.

11. The device as defined in claim 10 and wherein said last mentioned means comprises a pair of resilient support wall members carrying said beads and means limiting deflection of one of said support members.

12. The device as defined in claim 9 further comprising means adapted to suddenly vary the resistance of said filtering material for a predetermined clogged condition of said filter element.

13. The device as defined in claim 9 wherein said mentioned means comprises:
   (a) a first stationary electrical contact;
   (b) a second movable electrical contact on said filtering material;
   (c) associated electrical connections between said contacts so as to electrically substantially shorten the effective electrical length of said filtering material when said contacts are engaged; and
   (d) said second contact being mounted on a portion of said filter element adapted to move toward said first contact as a result of fluid pressure differential across said filter element so as to engage said first contact upon a predetermined pressure differential corresponding to a predetermined state of clogging of said filter element.

14. The device as defined in claim 13 wherein said filter element is flexibly movable toward said first contact.

15. The device as defined in claim 13 wherein said filter element is hingedly movable toward said first contact and is urged away from said first contact by spring means.

16. The device as defined in claim 15 further comprising fluid by-pass means for permitting fluid to by-pass said filter element when said filter element is hingedly moved to the position engaging said first and second contacts.

References Cited

UNITED STATES PATENTS

| | | | |
|---|---|---|---|
| 2,349,992 | 5/1944 | Schrader | 210—85 X |
| 2,727,634 | 12/1955 | O'Meara | 210—445 |
| 2,732,948 | 1/1956 | Koupal et al. | 210—356 X |
| 3,317,042 | 5/1967 | Botstiber | 55—274 X |

REUBEN FRIEDMAN, *Primary Examiner.*

F. SPEAR, *Assistant Examiner.*